(12) United States Patent
Eriksen et al.

(10) Patent No.: US 9,784,247 B2
(45) Date of Patent: Oct. 10, 2017

(54) APPARATUS FOR DAMPENING OF ACOUSTIC NOISE GENERATED BY AIR-COOLING OF AT LEAST ONE WIND TURBINE COMPONENT PROVIDED WITH THE NACELLE OF A WIND TURBINE

(71) Applicant: SIEMENS AKTIENGESELLSCHAFT, München (DE)

(72) Inventors: Uffe Eriksen, Horsens (DK); Steffen Lorentzen, Hoerning (DK); Thorkil Munk-Hansen, Give (DK); Claus Thygesen, Låsby (DK)

(73) Assignee: Siemens Aktiengesellschaft (DE)

( * ) Notice: Subject to any disclaimer, the term of this patent is extended or adjusted under 35 U.S.C. 154(b) by 301 days.

(21) Appl. No.: 14/643,069

(22) Filed: Mar. 10, 2015

(65) Prior Publication Data
US 2015/0308408 A1 Oct. 29, 2015

(30) Foreign Application Priority Data
Apr. 25, 2014 (EP) ..................... 14166023

(51) Int. Cl.
*F03D 11/00* (2006.01)
*F03D 80/60* (2016.01)

(52) U.S. Cl.
CPC .......... *F03D 80/60* (2016.05); *F05B 2240/14* (2013.01); *F05B 2260/201* (2013.01); *F05B 2260/964* (2013.01); *Y02E 10/72* (2013.01)

(58) Field of Classification Search
CPC . F03D 80/00; F03D 80/60; F03D 9/25; F05B 2240/14; F05B 2260/96;
(Continued)

(56) References Cited

U.S. PATENT DOCUMENTS 5,167,118 A * 12/1992 Torkelson ............... F02K 1/827
181/213
5,936,210 A * 8/1999 Borneby ................... F01N 1/10
181/256

(Continued)

FOREIGN PATENT DOCUMENTS

DE 102004014876 A1 10/2005
DE 102004018758 A1 11/2005
(Continued)

OTHER PUBLICATIONS

Extended European Search Report for European Application No. 14166023.3, dated Oct. 10, 2014.

*Primary Examiner* — Christopher Verdier
(74) *Attorney, Agent, or Firm* — Schmeiser Olsen & Watts LLP (57) ABSTRACT

An apparatus for dampening of acoustic noise generated by air-cooling of at least one turbine component provided with the nacelle of a wind turbine is provided. Apparatus for dampening of acoustic noise generated by air-cooling of at least one wind turbine component provided with the nacelle of a wind turbine, comprising at least one acoustic dampener, with the acoustic dampener including at least one acoustic dampening channel structure having at least one acoustic dampening channel connected with at least one inlet opening of the acoustic dampening channel structure and at least one outlet opening of the acoustic dampening channel structure.

13 Claims, 4 Drawing Sheets

(58) Field of Classification Search
CPC .......... F05B 2260/962; F05B 2260/964; F05B 2260/20; Y02E 10/72; Y02E 10/722; Y02E 10/725; Y02E 10/726; F02C 7/045; F02K 1/827
USPC ......... 415/119, 175–178; 416/244 R, 244 A, 416/95, 93 R, 248, 500; 181/222, 224
See application file for complete search history.

(56) References Cited

U.S. PATENT DOCUMENTS

| | | | |
|---|---|---|---|
| 2008/0197638 A1* | 8/2008 | Wobben | H02K 9/04 290/55 |
| 2009/0032330 A1* | 2/2009 | Holmgren | B60H 1/00564 181/224 |
| 2009/0200103 A1* | 8/2009 | Potschka | F15D 1/04 181/224 |
| 2011/0272949 A1 | 11/2011 | Matsuo et al. | |
| 2012/0201665 A1* | 8/2012 | Tabatabaian | F03D 1/04 415/208.1 |

FOREIGN PATENT DOCUMENTS

| | | |
|---|---|---|
| EP | 1218638 B1 | 8/2006 |
| EP | 2535580 A1 | 12/2012 |
| EP | 2764306 A1 | 10/2014 |
| EP | 2806542 A1 | 11/2014 |
| WO | WO 2010005289 A2 | 1/2010 |

\* cited by examiner

APPARATUS FOR DAMPENING OF ACOUSTIC NOISE GENERATED BY AIR-COOLING OF AT LEAST ONE WIND TURBINE COMPONENT PROVIDED WITH THE NACELLE OF A WIND TURBINE

CROSS-REFERENCE TO RELATED APPLICATIONS

This application claims priority to EP Application No. 14166023, having a filing date of Apr. 25, 2014, the entire contents of which are hereby incorporated by reference.

FIELD OF TECHNOLOGY

The following relates to an apparatus for dampening of acoustic noise generated by air-cooling of at least one wind turbine component provided with the nacelle of a wind turbine.

BACKGROUND

Air-cooling of wind turbine components provided with the nacelle, e.g. electric generators, of wind turbines is a common approach for cooling respective wind turbine components. Thereby, a device for air-cooling creates a concerted flow of a cooling gas, e.g. air, through respective cooling channels provided with the wind turbine component. After exiting the wind turbine component, the cooling gas typically is blown or sucked out of the nacelle of the wind turbine, i.e. the cooling gas is blown or sucked through an opening provided with the nacelle of the wind turbine.

The operation of the device for air-cooling and particularly, the flow of the cooling gas through a respective opening in the nacelle regularly leads to a remarkable generation of acoustic noise.

SUMMARY

An aspect relates to an apparatus allowing for an effective and reliable dampening of acoustic noise generated by air-cooling of at least one wind turbine component provided with the nacelle of a wind turbine.

A further aspect relates to an apparatus for dampening of acoustic noise generated by air-cooling of at least one wind turbine component provided with the nacelle of a wind turbine, with the apparatus comprising at least one acoustic dampening means, with the acoustic dampening means comprising at least one acoustic dampening channel structure having at least one acoustic dampening channel connected with at least one inlet opening of the acoustic dampening channel structure and at least one outlet opening of the acoustic dampening channel structure.

The present embodiment of the invention provides an apparatus allowing for an effective and reliable dampening of acoustic noise generated by air-cooling of wind turbine components provided with the nacelle of a wind turbine.

Such wind turbine components are an electric generator, a, particularly mechanical or hydraulic, transmission means disposed between the or an electric generator and a rotor hub, a, particularly mechanical or hydraulic, rotor blade pitching means for pitching rotor blades, a braking means for braking rotation of a rotor hub, or a control unit, for instance. A respective electric generator may be a direct driven generator which may be attached to an end part, flange, main shaft and/or bearing of the nacelle. Generally all wind turbine components disposed inside and/or outside the nacelle are embraced by the phrasing "wind turbine component provided with the nacelle of a wind turbine".

The apparatus comprises at least one acoustic dampening means which allows for dampening of acoustic noise or acoustic emissions generated by air-cooling of a respective wind turbine component or directly or indirectly related to air-cooling of a respective wind turbine component. In other words, the at least one acoustic dampening means is adapted to realise an acoustic dampening effect, i.e. a reduction of acoustic noise directly or indirectly originating from air-cooling of a respective wind turbine component.

The acoustic dampening means comprises at least one acoustic dampening channel structure having at least one acoustic dampening channel connected with or communicating with at least one inlet opening of the acoustic dampening channel structure and at least one outlet opening of the acoustic dampening channel structure. Hence, the acoustic dampening channel structure comprises respective, particularly tube-like, wall elements defining at least one, typically longitudinal, acoustic dampening channel through which a cooling gas may flow. Therefore, a respective acoustic dampening channel may be perceived as a flow channel.

The cross-sectional shape of a respective acoustic dampening channel may be rectangular. However, other cross-sectional shapes, e.g. circular, elliptic, or oval shapes, are also feasible. The cross-section of a respective acoustic dampening channel may vary along the length of its course, i.e. between a respective inlet opening and a respective outlet opening. If the acoustic dampening channel structure comprises a plurality of acoustic dampening channels, the acoustic dampening channels may be at least partially provided with the same or different cross-sections.

The aforementioned technical effect of dampening respective acoustic noise is realised by a concerted flow of the cooling gas having exited the wind turbine component through the acoustic dampening channel structure, i.e. respective acoustic dampening channels, which leads to a reduction of the acoustic noise level.

Hence, the flow of a respective cooling gas has to be directed in such a manner so as to enter the acoustic dampening channel structure at respective inlet openings, flow through at least one acoustic dampening channel of the acoustic dampening channel structure, whereby a reduction of acoustic noise is realised, and exit the acoustic dampening channel structure at respective outlet openings. In order to direct the flow of the cooling gas through the acoustic dampening channel structure acoustic dampening channels, fan and/or suction means, e.g. fans, ventilators, etc., may be provided which allow for blowing and/or sucking the cooling gas through the acoustic dampening channel structure.

It is possible that the acoustic dampening channel structure comprises a plurality of, i.e. at least two, separate acoustic dampening channels. In this case, different configurations of respective inlet openings, outlet openings, and acoustic dampening channels extending between respective inlet openings and outlet openings are possible.

The acoustic dampening channels may be connected with a common inlet opening and with a common outlet opening. Thus, all acoustic dampening channels may have the same inlet opening and the same outlet opening, i.e. all acoustic dampening channels may communicate with the same inlet opening and with the same outlet opening.

Yet, it is also possible that each acoustic dampening channel is connected with a separate inlet opening and with a separate outlet opening. Thus, each acoustic dampening channel may have its own inlet opening and its own outlet opening, i.e. each acoustic dampening channel may communicate with its own inlet opening and with its own outlet opening.

Further, it is possible that the acoustic dampening channels or a group of at least two acoustic dampening channels are connected with a common outlet opening and with separate inlet openings. Hence, the acoustic dampening channels may have the same outlet opening and different inlet openings, i.e. the acoustic dampening channels may communicate with a common outlet opening, whereas they may communicate with different inlet openings.

Inversely, it is possible that the acoustic dampening channels or a group of at least two acoustic dampening channels are connected with a common inlet opening and with separate outlet openings. Hence, the acoustic dampening channels may have the same inlet opening and different outlet openings, i.e. the acoustic dampening channels may communicate with a common inlet opening, whereas they may communicate with different outlet openings. This embodiment is of particular interest since it has been observed that splitting the acoustic dampening channel structure in respective separate acoustic dampening channels after a single inlet opening, may result in a significant reduction of acoustic noise.

Regarding an acoustic dampening channel structure comprising a plurality of acoustic dampening channels, it is possible that at least two acoustic dampening channels have the same or differently orientated courses. Hence, the orientation of the courses of respective acoustic dampening channels may be the same, i.e. all acoustic dampening channels may have equally orientated courses. This may be realised by a parallel arrangement of respective acoustic dampening channels of the same shape, for instance.

Otherwise, the orientation of the courses of respective acoustic dampening channels may differ, i.e. at least two acoustic dampening channels may have different courses. This may be realised by a non-parallel arrangement of respective acoustic dampening channels of the same shape or by an arrangement of acoustic dampening channels having different shapes, for instance.

Generally, the course of a respective acoustic dampening channel is mainly defined by its longitudinal extension between a respective inlet opening and a respective outlet opening and/or spatial modifications of its longitudinal extension relative to a straight reference axis.

The dimensions, size, and shape of a respective acoustic dampening channel structure should be defined under consideration of the constructive and/or spatial circumstances of the wind turbine which is to be equipped with the apparatus, i.e. particularly a respective nacelle of the wind turbine which is to be equipped with the apparatus. Thus, there are no mandatory specifications on dimensions, size, and shape of a respective acoustic dampening channel structure or respective acoustic dampening channels, respectively.

Therefore, it is possible that the course of at least one acoustic dampening channel is at least partially curved relative to a vertical and/or a horizontal reference axis. Thus, respective wall elements defining a respective acoustic dampening channel may have a wide range of shapes, such as convexly or concavely curved, elliptic, oval, etc. shapes, for instance. Consequently, respective acoustic dampening means may be provided with different shapes embracing and arc-like, curved, elliptic, and planar shapes, for instance.

Accordingly, a so called "Renault"-shaped damper may be realised by two acoustic dampening channels having oppositely curved courses relative to a vertical reference axis. In this embodiment, the two acoustic dampening channels have oppositely curved courses relative to each other. According to this embodiment, the distance between respective oppositely disposed wall elements defining respective acoustic dampening channels has a maximum. This is explained in that a central portion of both acoustic dampening channels partially curves outwards so that the distance between respective wall elements is at a maximum in the region of their central portions. The two acoustic dampening channels preferably, however not mandatorily, are connected with separate outlet openings in this embodiment.

In order to increase the efficiency of acoustic dampening, it is possible that least one acoustic dampening channel is at least partially provided with at least one acoustic dampening element, with the at least one acoustic dampening element comprising at least one acoustic dampening material and/or at least one acoustic dampening surface structuring. Respective acoustic dampening elements typically at least partially cover respective inner portions of wall elements defining respective acoustic dampening channels. They do not negatively influence the flow of a cooling gas through the acoustic dampening channel structure. Attachment of respective acoustic dampening elements to respective wall elements may be realised by any of form- and/or force- and/or material-fit. Hence, respective acoustic dampening elements may be adhered, brazed, welded, or screwed to respective inner portions of respective wall elements, for instance.

Appropriate materials for building respective acoustic dampening elements are all kinds of materials allowing for absorption of acoustic noise or a dampening effect of acoustic noise, respectively. Hence, respective materials embrace fibre materials, such as mineral wool, e.g. glass wool, and foam materials, such as, particularly open cellular, synthetic polymer or metallic foams, for instance.

The thickness of a respective acoustic dampening element usually lies in the range of 20 to 200 mm, particularly 50 to 100 mm. Of course, exceptions from the named range are possible.

The acoustic dampening element may be at least partially provided with an acoustic dampening surface structuring. A respective acoustic dampening surface structuring may be realised by bores or holes, i.e. blind bores/holes or through bores/holes, provided with the surface of the plate-like member. The plate-like member may be made of metal, e.g. steel, or polymer, for instance.

According to a preferred embodiment, an acoustic dampening element may comprise a base body built of a respective dampening material. Further, the acoustic dampening element comprises a plate-like member attached to the base body, the plate-like member having a number of bores or holes, i.e. blind bores/holes or through bores/holes, therein. The plate-like member typically builds the freely exposed surface of the dampening element, i.e. the surface which is freely exposed within a respective acoustic dampening channel.

Moreover, embodiments of the invention relates to a wind turbine comprising a nacelle provided with at least one wind turbine component, at least one device for air-cooling of the at least one wind turbine component provided with the nacelle, and at least one apparatus for dampening of acoustic noise generated by air-cooling of the wind turbine component as specified above. Generally, all annotations concerning the apparatus also apply to the wind turbine and vice versa.

The device for air-cooling of the wind turbine component may comprise a fan and/or suction means allowing for a concerted flow of a cooling gas, e.g. air, along or through the wind turbine component, i.e. particularly respective cooling channels provided with the wind turbine component. Concerning a wind turbine component in the shape of an electric generator, i.e. particularly a direct driven electric generator, respective cooling channels may be provided with the stator and/or the rotor.

At least one acoustic dampening means may be provided in the inside of the canopy or nacelle of the wind turbine and/or at least one acoustic dampening means may be provided at the outside of the canopy or nacelle of the wind turbine. Hence, a respective acoustic dampening means may be provided within the nacelle, i.e. provided at an inner wall of the nacelle or at a respective component disposed within the nacelle, or attached to the outside of the nacelle, i.e. provided at an outer wall of the nacelle. Of course, it is also possible that a respective acoustic dampening means extends between the inside and the outside of a nacelle. Generally, the arrangement of a respective acoustic dampening means should be chosen under consideration of given constructive and/or spatial circumstances of the canopy or nacelle of the wind turbine which is to be equipped with the apparatus.

In case of a respective acoustic dampening means being provided in the inside of the nacelle, it is preferred that at least one outlet opening of the acoustic dampening channel structure is provided within an outer wall of the or a nacelle of the wind turbine or communicates with an opening in an outer wall of the or a nacelle of the wind turbine. Hence, a cooling gas may be concertedly directed from a respective wind turbine component through the dampening means, i.e. the acoustic dampening channel structure, to the environment of the nacelle.

Consequently, in case of respective acoustic dampening means being provided at the inside of the nacelle, it is preferred that at least one inlet opening of the acoustic dampening channel structure is provided within an opening in the outer wall of the nacelle of the wind turbine or communicates with an opening in an outer wall of the nacelle of the wind turbine.

In order to force a cooling gas exiting the wind turbine component to flow into the acoustic dampening channel structure, it is preferred that the or at least one inlet opening of the acoustic dampening channel structure is directly or indirectly connected with the wind turbine component, i.e. particularly with at least one cooling channel provided with the wind turbine component. A direct connection between a respective inlet opening of the acoustic dampening channel structure and a respective wind turbine component means that a respective inlet opening directly adjoins to a respective gas outlet of the wind turbine component or at least one cooling channel provided with the wind turbine component, respectively. An indirect connection between a respective inlet opening of the acoustic dampening channel structure and a respective wind turbine component means that at least one further, particularly tube-like, component is disposed between a respective inlet opening and a respective gas outlet of the wind turbine component or at least one cooling channel provided with the wind turbine component, respectively.

Preferably, at least one fan and/or suction means allowing for a concerted flow of a cooling gas having exited the wind turbine component through the acoustic dampening channel structure is provided. A respective fan and/or suction means may be disposed up-stream or downstream to the acoustic dampening means. In either case, the fan and/or suction means promotes a flow of the cooling gas having exited the wind turbine component through the acoustic dampening channel structure. The fan and/or suction means may be part of the device for air-cooling of the wind turbine component or separate to it.

A respective wind turbine component may be an electric generator, a, particularly mechanical or hydraulic, transmission means disposed between the or an electric generator and a rotor hub, a, particularly mechanical or hydraulic, rotor blade pitching means for pitching rotor blades, a braking means for braking rotation of the or a rotor hub, or a control unit, for instance. A respective electric generator may be a direct driven generator which further may be attached to an end part, flange, main shaft and/or bearing of the nacelle. Generally all wind turbine components disposed inside and/or outside the nacelle are embraced by the phrasing "wind turbine component provided with the nacelle of a wind turbine".

BRIEF DESCRIPTION

Some of the embodiments will be described in detail, with reference to the following figures, wherein like designations denote like members, wherein.

DETAILED DESCRIPTION

Figure 1:
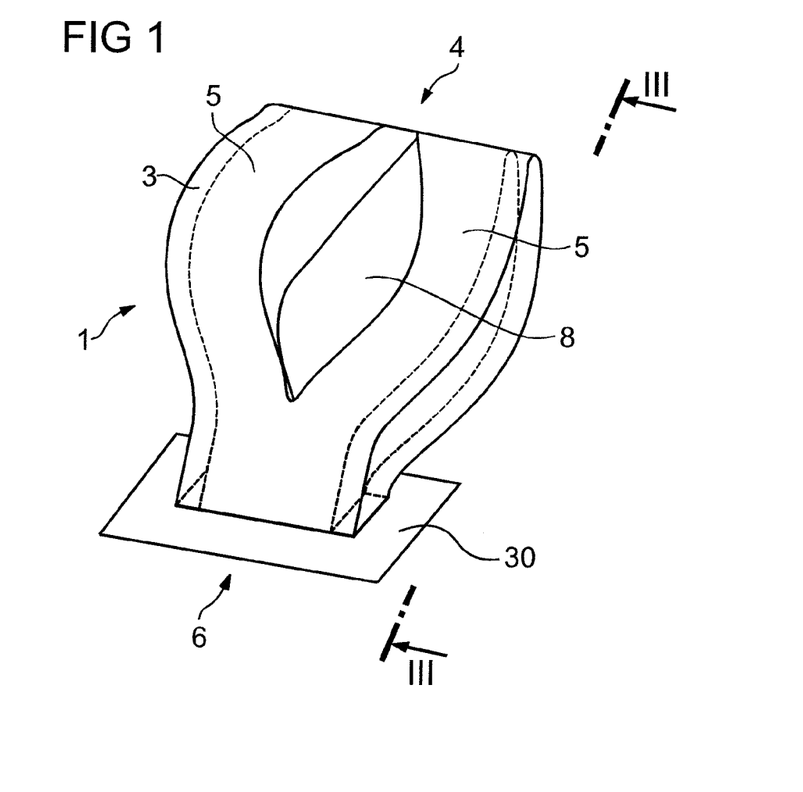
FIG. 1 shows a top perspective view of an apparatus according to an exemplary embodiment of the invention.
Figure 2:
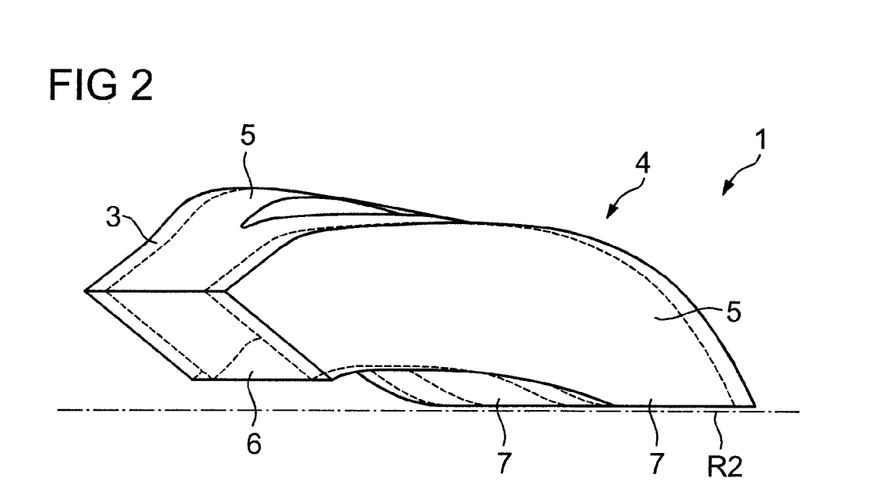
FIG. 2 shows a side view of the embodiment of FIG. 1.
Figure 3:
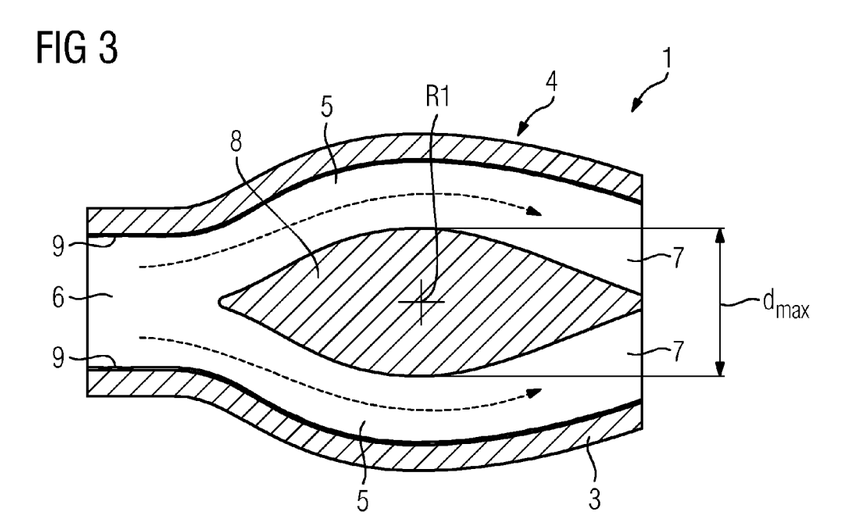
FIG. 3 shows a horizontal cut away view through of the embodiment of FIG. 1.

FIGS. 1-3 each shows a view of an apparatus 1 according to an exemplary embodiment of the invention. Thereby, FIGS. 1, 2 each show a perspective view of the apparatus 1 and FIG. 3 shows a horizontally cut view of the apparatus 1.

The apparatus 1 serves for dampening of acoustic noise generated by air-cooling of a wind turbine component provided with the nacelle 17 of a wind turbine. Such a wind turbine component may be an electric generator 2 (cf. FIG. 6) of a wind turbine, for instance. The electric generator 2 may be a direct driven generator which may be attached to an end part, flange, main shaft and/or bearing of the nacelle 17.

Other respective wind turbine components as represented by reference number 30 in FIG. 1 provided with the nacelle 17 are a, particularly mechanical or hydraulic, transmission means or device disposed between the electric generator 2 and a rotor hub, a mechanical or hydraulic, rotor blade pitching means or device for pitching rotor blades, a braking means or device for braking rotation of the or a rotor hub, or a control unit, for instance.

The apparatus 1 comprises an acoustic dampening means 3. The, acoustic dampening means 3 comprises an acoustic dampening channel structure 4 having at least one, i.e. in the embodiment of FIGS. 1-3 two, in the embodiment of FIG. 4 three acoustic dampening channels 5. Each acoustic dampening channel 5 is defined by respective wall elements of the acoustic dampening channel structure 4. The cross-section of the acoustic dampening channels 5 is rectangular.

The acoustic dampening channels 5 extend between at least one inlet opening 6 and at least one outlet opening 7 of the acoustic dampening channel structure 4. Referring to the embodiment of FIGS. 1-3, the acoustic dampening channels 5 are connected with a common inlet opening 6. However, each acoustic dampening channel 5 is connected with its own outlet opening 7. Thus, the two acoustic dampening channels 5 have the same inlet opening 6, whereas they have separate outlet openings 7. The stream of the cooling gas is indicated by the dotted arrows in FIG. 3.

As is particularly discernible from FIG. 1 and FIG. 3, the two acoustic dampening channels 5 are both curved relative to a vertical reference axis R1 (cf. FIG. 3). Thus, the courses of the two acoustic dampening channels 5, i.e. their longitudinal extension between the inlet opening 6 and a respective outlet opening 7, are oppositely curved.

Accordingly, the distance d between respective oppositely disposed wall elements defining the two acoustic dampening channels 5 has a maximum $d_{max}$ indicated by the double-arrow. This is explained in that respective central portions of the acoustic dampening channels 5 curve outwards in opposite directions so that the distance between respective wall elements has a maximum $d_{max}$ in the region of the central portions of the acoustic dampening channels 5. The elliptic-like space 8 between the oppositely disposed wall elements of the two acoustic dampening channels 5 may be empty.

Thus, the acoustic dampening channel structure 4 represents a so called "Renault" shaped damper comprising separate acoustic dampening channels 5 with opposite curvatures. However, the acoustic dampening channel structure 4 is essentially a symmetric component, i.e. particularly the two acoustic dampening channels 5 are symmetrical relative to the vertical reference axis R1, for instance.

As is discernible from FIG. 2, the acoustic dampening channel structure 4 is also entirely curved relative to a horizontal reference axis R2 giving the acoustic dampening means 3 an arc-like shape.

Inner portions of respective wall elements defining respective acoustic dampening channels 5 are at least partially provided with acoustic dampening elements 9. The acoustic dampening elements 9 are capable of absorbing acoustic noise and therefore, increase the dampening effect or efficiency of the apparatus 1. The acoustic dampening elements 9 comprise an acoustic dampening material, e.g. mineral wool, and at least one acoustic dampening surface structuring 10 (cf. FIG. 5), e.g. a surface provided with numerous bores or holes.

The acoustic dampening elements 9 are adhered to inner portions of respective wall elements defining the acoustic dampening channels 5. The thickness of a respective acoustic dampening element 9 lies in the range of 20 to 200 mm, particularly 50 to 100 mm.

Figure 5:
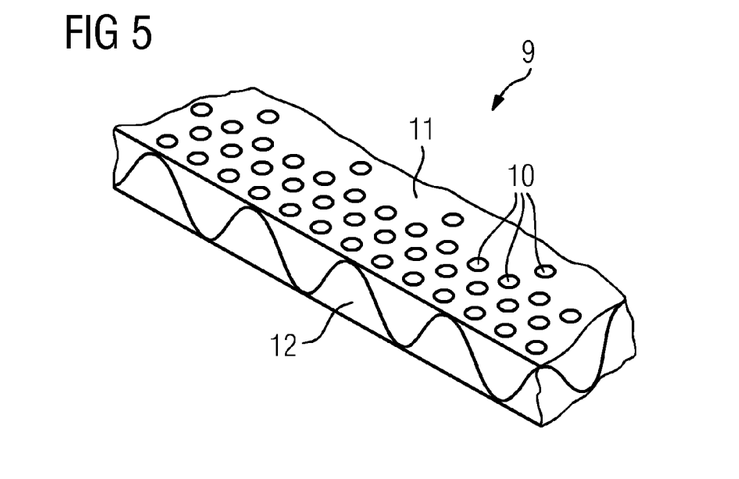
FIG. 5 shows a top perspective view of an acoustic dampening element according to another exemplary embodiment of the invention.

As is discernible from FIG. 5 showing a preferred embodiment of a respective acoustic dampening element 9, the acoustic dampening element 9 is provided with an acoustic dampening surface structuring 10 in the shape of bores, holes or the like provided with the surface of a comparatively thin plate-like member 11 made of metal, e.g. steel. The plate-like member 11 is attached, e.g. adhered, to a base body 12 made of a respective dampening material, e.g. mineral wool.

Figure 4:
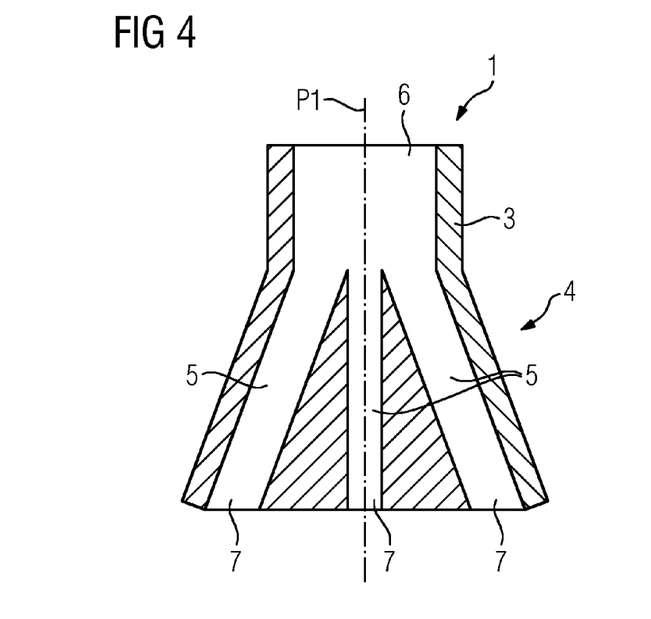
FIG. 4 shows a cut away view of an apparatus 1 according to a further exemplary embodiment of the invention

FIG. 4 shows a view of an apparatus 1 according to a further exemplary embodiment of the invention. In contrast to the embodiment of FIGS. 1-3, the acoustic dampening channel structure 4 comprises not two, but three separate acoustic dampening channels 5.

The acoustic dampening channels 5 are not curved, but straight. Yet, they are arranged with different angles relative to a vertical reference plane P1 so that the courses of the acoustic dampening channels 5 are different.

Again, the acoustic dampening channels 5 share a common inlet opening 6, whereas each acoustic dampening channel 5 communicates with its own outlet opening 7.

Concerning both the embodiments of FIGS. 1-3 and 4, tests have shown that by splitting the flow of a cooling gas having exited an air-cooled wind turbine component, e.g. an electric generator 2, through the acoustic dampening channel structure 4 in a number of separate acoustic dampening channels 5, a reduction of the acoustic noise level generated by air-cooling of the electric generator 2 up to 20% was achieved. Additionally, the provision of respective acoustic dampening elements 9 within the acoustic dampening channels 5 allows a further reduction of the acoustic noise level generated by air-cooling of the electric generator 2.

Figure 6:
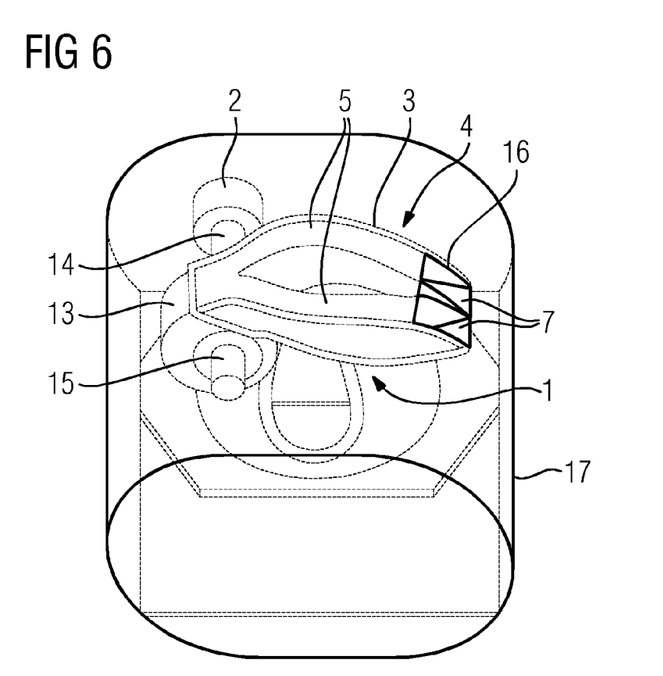
FIG. 6 shows a top perspective view of a nacelle of a wind turbine according to an exemplary embodiment of the invention.
Figure 7:
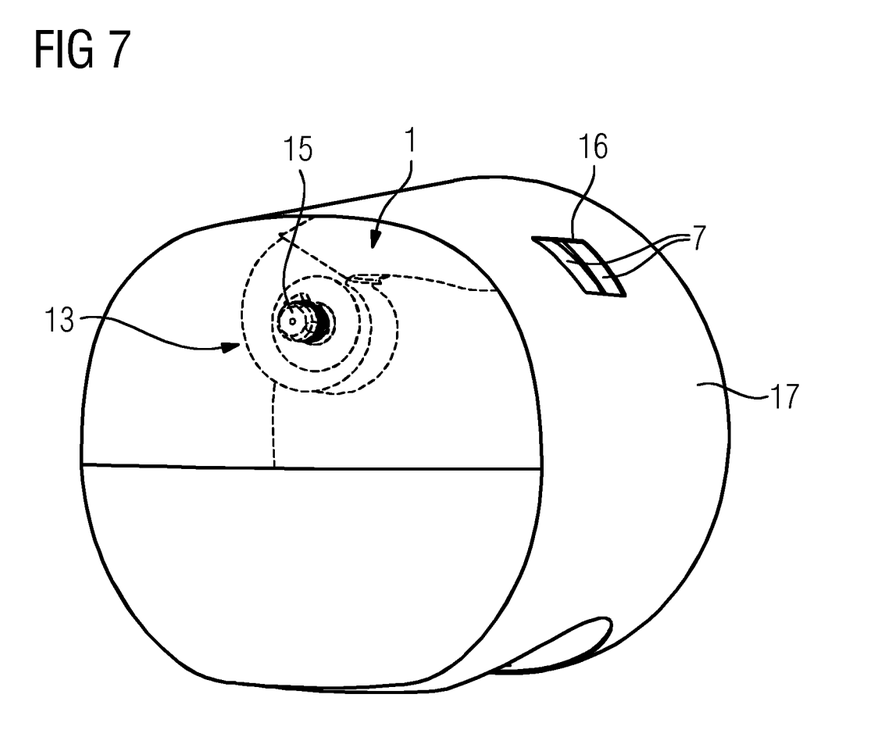
FIG. 7 shows a front perspective view of a nacelle of a wind turbine according to an exemplary embodiment of the invention

FIGS. 6, 7 each show a principle view of a nacelle 17 of a wind turbine according to an exemplary embodiment of the invention. Thereby, FIG. 6 shows a perspective view of the inside of the nacelle 17 with a number of components disposed within the nacelle 17, whereas FIG. 7 shows a perspective view of the outside of the nacelle 17.

Referring to FIG. 6, respective components are particularly a device 13 for air-cooling of the electric generator 2 of the wind turbine, tube-like member 14 connected upstream to the device 13, and the apparatus 1 connected downstream to the device 13. Thus, the device 13 is connected with the tube-like member 14 communicating with a cooling gas outlet of the electric generator 2 and with the inlet opening 6 of the acoustic dampening channel structure 4.

The device 13 comprises a fan and/or suction means 15. The fan and/or suction means 15, e.g. a fan or any other type of ventilating apparatus, provides a concerted flow of the cooling gas from the electric generator 2 both into and through the acoustic dampening channel structure 4.

According to FIGS. 6, 7, the apparatus 1 is mounted at respective inner walls of the nacelle 17. The apparatus 1 comprises appropriate mounting means (not shown) for being mounted to the nacelle 17. However, other mounting sites of the apparatus 1 are possible. Generally, the mounting site of the apparatus 1 is chosen under consideration of the constructive and/or spatial circumstances of the wind turbine, i.e. particularly the nacelle 17, of the wind turbine which is to be equipped with the apparatus 1.

FIGS. 6, 7 each show a view of a nacelle 17 of a wind turbine according to an exemplary embodiment of the invention. Thereby, FIG. 6 shows a perspective view of the inside of the nacelle 17 with a number of components disposed within the nacelle 17, whereas FIG. 7 shows a perspective view of the outside of the nacelle 17.

Although the present invention has been described in detail with reference to the preferred embodiment, the present invention is not limited by the disclosed examples from which the skilled person is able to derive other variations without departing from the scope of the invention.

The invention claimed is:

1. An apparatus for dampening of acoustic noise generated by air-cooling of at least one wind turbine component provided with a nacelle of a wind turbine, comprising at least one acoustic dampener having at least one inlet opening attached to an outlet of the at least one wind turbine component and wherein the at least one acoustic dampener having at least one outlet opening exhausting from the nacelle of the wind turbine, the acoustic dampener comprising a plurality of acoustic dampening channels with the acoustic dampening channels having a common inlet opening and a common outlet opening or the acoustic dampening channels each having a common inlet opening and a separate outlet opening.

2. The apparatus according to claim 1, wherein the plurality of acoustic dampening channels is a group of at least two acoustic dampening channels having a common inlet opening and separate outlet openings or the acoustic dampening channels or a group of at least two acoustic dampening channels having a common inlet opening and a common outlet opening.

3. The apparatus according to claim 1, wherein the acoustic dampening channel structure comprises at least two acoustic dampening channels having symmetrical or differently orientated courses.

4. The apparatus according to claim 1, wherein the course of at least one acoustic dampening channel is an at least partially curved course relative to at least one of a vertical and a horizontal reference axis.

5. The apparatus according to claim 4, comprising two acoustic dampening channels having oppositely curved courses relative to the at least one of a vertical and a horizontal reference axis.

6. The apparatus according to claim 1, wherein at least one acoustic dampening channel is at least partially provided with at least one acoustic dampening element, with the at least one acoustic dampening element comprising at least one acoustic dampening material and at least one acoustic dampening surface structuring.

7. The apparatus according to claim 6, wherein the acoustic dampening element comprises a base body built of the acoustic dampening material and at least one plate-like member attached to the base body, with the at least one plate-like member having a number of holes therein.

8. The wind turbine, comprising the nacelle provided with the at least one wind turbine component, at least one device for air-cooling of the at least one wind turbine component provided with the nacelle, and at least one apparatus according to claim 1.

9. The wind turbine according to claim 8, wherein at least one acoustic dampener is provided in at least one of the inside of the nacelle of the wind turbine and at least one acoustic dampener is provided at the outside of the nacelle of the wind turbine.

10. The wind turbine according to claim 9, wherein the at least one outlet opening is provided within an outer wall of the nacelle of the wind turbine or communicates with an opening in an outer wall of the nacelle of the wind turbine.

11. The wind turbine according to claim 8, wherein the at least one inlet opening is connected with at least one cooling channel provided with the at least one wind turbine component provided with the nacelle.

12. The wind turbine according to claim 8, wherein at least one fan and suction device allow for a concerted flow of a cooling gas having exited the at least one wind turbine component provided with the nacelle through the acoustic dampening channels is provided.

13. The wind turbine according to claim 8, wherein the at least one wind turbine component provided with the nacelle is an electric generator, a mechanical or hydraulic transmission device disposed between the electric generator and a rotor hub, a rotor blade pitching device for pitching rotor blades, a brake for braking rotation a rotor hub, or a control unit.

* * * * *